May 5, 1970 R. COHEN 3,510,599
IDLE TEST CIRCUITS FOLDED NETWORKS
Filed March 15, 1967
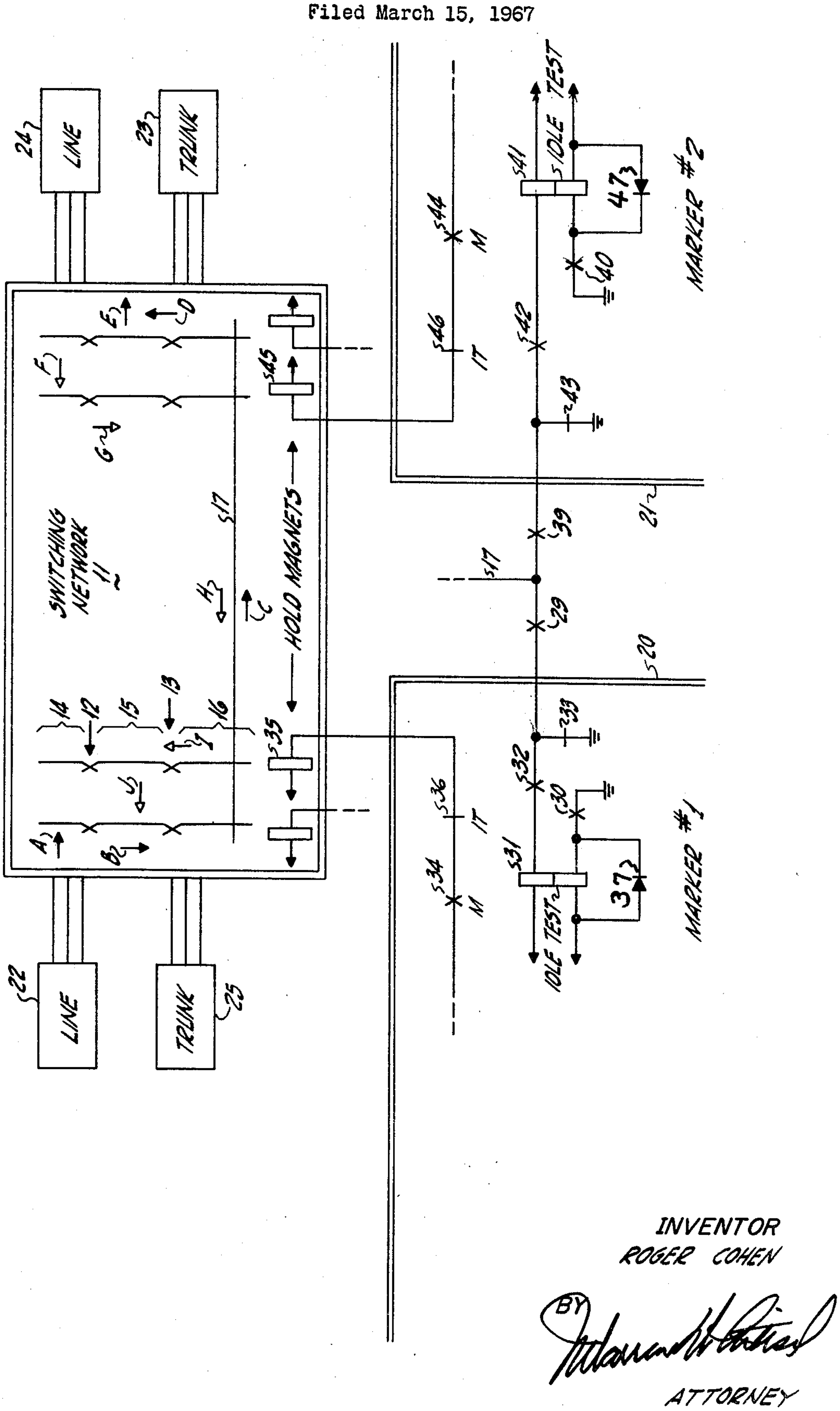
INVENTOR
ROGER COHEN
BY
ATTORNEY 3,510,599

IDLE TEST CIRCUITS FOR FOLDED NETWORKS

Roger Cohen, Bayamon, Puerto Rico, assignor to International Telephone and Telegraph Corporation, New York, N.Y., a corporation of Maryland Filed Mar. 15, 1967, Ser. No. 623,267
Int. Cl. H04m 3/22
U.S. Cl. 179—18 5 Claims

ABSTRACT OF THE DISCLOSURE

An idle test relay circuit is provided for each of many telephone system markers which may operate in parallel to seize the same idle equipment. The relay releases when the equipment is idle and holds when the equipment is busy. If two markers test simultaneously, one finds that the tested equipment is idle, and the other finds that it is busy. The resulting release of the test relay in the one marker circuit applies a busy ground to hold the relay in the other marker. Responsive thereto, the other marker skips over the busy equipment and tests the next equipment.

This invention relates to circuits for making tests in automatic telephone systems and more particularly to circuits for making idle tests upon other circuits which may be seized from more than one point of access.

Usually, switching equipment is able to extend a connection in a one-way direction. For example, inter-stage wires, called "junctors" are generally seized on an originate end, and they, in turn, apply potentials which seize equipment from their other or terminate end. It the originate end is idle when it is seized, the terminate end is also idle. There is no problem.

On the other hand, some networks are "folded" so that calls may be extended through them in either of two directions. Thus, it is possible that either end of a wire may be an originating point of access for some calls and the other ends may be the terminating point of access for such calls, depending upon the route which happens to be taken through the network, existing busy conditions, and the like. Since a plurality of calls may be processed simultaneously, it is possible that two separate equipments independently placing calls might simultaneously seize the wire on each of its two ends since each end appears to be idle at the instant before the simultaneous seizure occurs. Of course, this double seizure should not be allowed to happen.

Accordingly, an object of the invention is to preclude double seizure of a circuit which is available to a plurality of other circuits. More particularly, an object is to guard against double seizure of a piece of equipment in a folded network when two common circuits are demanding the same type of equipment. In this connection, an object is to enable one demanding circuit to seize the demanded circuit while precluding seizure of the demanded circuit by the other demanding circuit. Conversely stated, an object is to preclude the situation where the demanded circuit is made busy to both demanding circuits so that neither is allowed to complete a connection.

In keeping with one aspect of the invention, these and other objects are accomplished by providing an idle test relay in each marker. In the first marker to operate, the test relay releases to close a circuit for precluding the release of an idle test relay in the second marker. This way, the markers gain access to the tested circuit on a first-come, first-served basis. The first marker to gain such an access seizes control and bars the other from gaining access.

The above mentioned and other features of this invention and the manner of obtaining them will become more apparent, and the invention itself will be best understood by reference to the following description of an embodiment of the invention taken in conjunction with the accompanying drawings, in which a single sheet of drawing is a schematic circuit diagram showing the idle test circuits in two markers.

The drawing shows a folded switching network 11 of any suitable design. In a preferred embodiment of the invention, this network may take a form shown in a copending application entitled "Automatic Switching Matrix," Ser. No. 430,136, filed Feb. 3, 1965 (now Pat. No. 3,441,677) by Erwin, Field, and Mahood, and assigned to the assignee of this invention. According to the teachings in this application, the network 11 includes a plurality of crossbar switches having their verticals cut as at 12 and 13, to provide three isolated sections of crosspoints, as at 14, 15, 16. The drawing shows an exemplary four such verticals; however, any convenient number of such verticals may be provided. Switch paths are established through network 11 by closing crosspoints in a manner which selectively interconnects the partial path parts through the isolated sections. For example, a switch path through network 11 might enter section 14, be selectively connected across the isolating vertical split 12, and exit through section 15.

The object of a switching network is, of course, to interconnect various pieces or kinds of equipment, two kinds of which are here generically called "Lines" and "Trunks." Thus, the object of this greatly simplified network 11 is to interconnect one line which is demanding service with one trunk which is capable of giving the demanded service. Those skilled in the art will readily perceive many types of equipments, other than lines and trunks, which can be interconnected by a network, such as this.

The "Lines" are connected to the first section of crosspoints 14 which are isolated by the vertical splits 12. The "Trunks" are connected to the second section of crosspoints 15 which are isolated between the vertical splits 12 and 13. Wires (called "junctors") are connected to the third section of crosspoints 16, isolated by the split 13. These junctors form partial parts of a switch path, and they interconnect the verticals to provide intranetwork paths between crosspoints if more than one vertical is used to complete the desired connection. One such junctor 17 is here shown by way of example; any suitable number of junctors may be provided.

The network is controlled by a number of common control devices, such as markers 20, 21. To explain the invention, it may be assumed that the markers 20, 21 are simultaneously processing two independent calls, each call originating at a different "Line" and destined for a different "Trunk." Moreover, for purposes of this explanation, it may be assumed that the first marker 20 is attempting to complete a path from line 22 through the network 11 to trunk 23 (this path is represented by the solidly-inked arrowheads A–E). The second marker 21 is simultaneously attempting to complete a path from line 24 through the network 11 to trunk 25 (this path is represented by the outlined arrowheads F–J). These two calls are totally unrelated to each other—except with respect to time in that each of the lines 22, 24 placed a call at the same time. This simultaneousness is a random event.

By inspection, it is obvious that the junctor 17 can—but must not—carry traffic in both of these paths. If it were included as parts of both paths, there would be a double connection between these two unrelated calls. Obviously, such a double connection cannot be allowed.

Therefore, one of the markers must be forced to fail in its attempt to complete this connection.

If the two markers 20, 21 test the junctor 17 sequentially, there is no probem. The first marker to make the busy test seizes the junctor and makes it busy to the other marker before that other marker begins its test.

On the other hand, if the two markers should—as a random matter—test the junctor 17 substantially simultaneously, each finds it idle and each attempts to complete the connection. Since the markers operate at a high occupancy (such as 50% of the time) during rush hours and at relatively slow electromechanical speeds, such simultaneous testing is likely to occur often enough to cause a serious problem if it is not corrected. Therefore, some means must be provided to prevent both of the demanding circuits 20, 21 from seizing the same demanded circuit 17.

In keeping with the teachings of the invention, the test circuit in each of the demanding markers is arranged to supply a busy marking to the test circuit in the other of the markers. When the demanded circuit is tested, neither marker may seize it if it is then busy from a previous call. If it is idle, either or both markers might seize it initially. However, as each test circuit goes through its sequence of operations, it removes a holding circuit for the other. During the natural sequence of events, it is almost certain that one of the test circuits either operates first or has its holding circuit opened first. Hence, one will almost certainly operate or hold first before the other and thereby lock out the other to prevent such double connections.

In greater detail, the junctor 17 is connected to one winding of an IDLE TEST relay in each marker which is capable of seizing that junctor. In all likelihood, this wire is the well known sleeve lead in a group of three or four wires including the equally well known tip and ring conductors.

The process begins when any suitable device (not shown) closes contacts 29 to associate the marker 20, for example, with the part of the network including the junctor 17, among others. An exemplary marker is shown in U.S. patent application S.N. 623,339, filed March 15, 1967, by Erwin, Field, Mahood, and Cohen, and assigned to the assignee of this invention. If the marker 20 attempts to select the path A–E, it closes contacts 30 and operates idle test relay 31. Relay 31 closes its make contacts 32 and opens its break contacts 33. Then, the marker 20 opens contacts 30, and the idle test relay 31 releases if the junctor 17 is idle. If the junctor is busy, ground appears on it, and idle test relay 31 is held operated from that ground. Thereafter, the marker 20 closes make contacts 34. If the junctor 17 is idle, a hold magnet 35 operates via idle test relay contacts 36. If the junctor 17 is busy, relay 31 is held by the busy ground appearing thereon. Contacts 36 are open, and the hold magnet 35 does not operate. Assume an idle junctor condition. After the hold magnet 35 operates, the junctor 17 is included in the path A–E, and the marker 20 proceeds to perform any other function in any known manner. Any suitable equipment applies a sleeve ground to mark the junctor 17 busy to other equipment.

Next, assume that the marker 20 attempts to complete the path A–E at the same instant when marker 21 attempts to complete path F–J. Assume further that this is a realistic system wherein components differ from each other in some slight manner so that there are minor differences in operate and release time. Thus, it is almost impossible for the two markers 20, 21 to perform all of their functions in absolute synchronism. In the highly unlikely event that such absolute synchronism does occur, it is a random event which would not likely recur in any manner which would require a circuit designer to give any added thought to it. (The same components in the two markers have the same reference numerals except that those in marker 20 have a "3" in the tens position and those in marker 21 have a "4" in the tens position.)

Equipment, not shown, closes contacts 29, 39 to associate both of the demanding markers with the same demanded equipments, including the junctor 17. Markers 20 and 21 close contacts 30, 40, respectively. Relays 31, 41 operate and open contacts 33, 43 while closing contacts 32, 42. Markers 20 and 21 open contacts 30, 40. If there were absolute synchronism in the operation and release, each of the relays might drop to indicate an idle condition; however, this is next to impossible. Moreover, to get further away from that possibility of absolute synchronism, the test relays are made slow release by the diodes 37, 47 which shunt the lower windings. Hence, it is almost certain that one of the relays 31 or 41 will release before the other.

Assume that relay 41 releases first. Contacts 43 close and apply ground to hold the relay 31 operated, the holding circuit including contacts 43, 39, 29, 32. With relay 41 released, marker 21 closes contacts 44, and operates the hold magnet 45 via contacts 46. With relay 31 operated, the marker 20 does not close contacts 34; rather, it steps on (in any known manner) to test the next junctor. After the hold magnet 45 operates responsive to the release of relay 41, the junctor 17 sleeve is marked by a busy ground, in any suitable manner. The path F–J is now completed.

It should be obvious that if an assumption had been made that relay 31 released before relay 41, relay 41 would have held operated via a path including contacts 42, 39, 29, and 33. Marker 20 would then have seized junctor 17 and completed path A–E. Marker 21 would have stepped on to test the next junctor.

An advantage over previous circuits of this type is that one of the markers will almost certainly be able to complete the connection if the junctor is idle. Previous circuits sometimes prevented both markers from making such a connection. Moreover, the inventive idle test circuit is quite inexpensive since most marker circuits of this type already include virtually all of the components, except for contacts 32, 33, 42 and 43. Those skilled in the art will readily perceive other advantages and uses of the invention.

While the principles of the invention have been described above in connection with specific apparatus and applications, it is to be understood that this description is made only by way of example and not as a limitation on the scope of the invention.

I claim:

1. An idle test circuit comprising an electromechanical switching matrix of crossbar switches, a plurality of equipments including said matrix which may be selectively and temporarily inter-connected to function as a unit, a plurality of parallel connectible bistable means for testing the crossbar equipments for idle conditions prior to said temporary inter-connection thereof, whereby there may be a simultaneous idle testing of the same equipment, means for initially closing an operating circuit for said testing means to make an association between the testing means and the equipment under test, means for thereafter breaking the operating circuit of said testing means, said testing means being operated to one of its bistable conditions if said tested equipment is busy and operated to another of its bistable conditions if said tested equipment is idle, and means in each of said testing means responsive to the operation of said test means to said other condition for operating all parallel connected test means to said one condition.

2. The circuit of claim 1 wherein said equipments are partial path parts of said crossbar switching network and said temporary interconnection comprises a complete switch path through said network, said idle testing means comprising a plurality of relay markers for controlling said network

3. The circuit of claim 2 wherein each of said partial path parts has an individually associated idle test lead which is marked with a given potential when said part is busy, means for making parallel connections between said lead and each of a plurality of said markers when said markers are controlling said network, means in each of said parallel connected markers for applying a signal over said lead to block the other of said markers from controlling said network to make a connection including the partial path represented by said lead, whereby there is a race between said markers, and means in the first marker to complete an idle test for applying said signal to said other markers while precluding other markers from blocking it.

4. A switching network control circuit, said network comprising a plurality of switching means interconnected by a plurality of junctors, each junctor including a sleeve lead, means for marking said sleeve with a given potential when said sleeve is busy, a plurality of markers for selectively controlling said network, each of said markers including a test relay, means for connecting said sleeve to said relay to operate said relay to a given position responsive to said given potential on said sleeve, and means responsive to operation of a test relay in one of said markers to said given position for blocking operation of said test relays in any other of said markers which might then be making a busy test.

5. The network of claim 4 wherein said last named means comprises means for selectively operating said relay responsive to a selection of said junctor, means responsive to operation of said relay for removing a busy marking from said sleeve, means for breaking said operating circuit to said relay whereby said relay releases unless a busy marking appears on said sleeve, and means responsive to release of said relay for returning said busy marking to said sleeve, thereby locking out any other marker then making a busy test.

References Cited

UNITED STATES PATENTS

| | | |
|---|---|---|
| 3,210,478 | 10/1965 | Klees et al. |
| 3,294,921 | 12/1966 | Bergholtz et al. |

KATHLEEN H. CLAFFY, Primary Examiner

T. W. BROWN, Assistant Examiner